United States Patent
Chou

(10) Patent No.: US 7,843,500 B2
(45) Date of Patent: Nov. 30, 2010

(54) IMAGE CAPTURING DEVICE AND BRIGHTNESS CORRECTING METHOD THEREOF

(75) Inventor: Tsun-Hou Chou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 306 days.

(21) Appl. No.: 12/202,327

(22) Filed: Sep. 1, 2008

(65) Prior Publication Data

US 2009/0256923 A1 Oct. 15, 2009

(30) Foreign Application Priority Data

Apr. 11, 2008 (CN) .................... 2008 1 0301056

(51) Int. Cl.
*H04N 9/64* (2006.01)

(52) U.S. Cl. ..................................... 348/243

(58) Field of Classification Search .......... 348/241, 348/243, 222.1
See application file for complete search history.

(56) References Cited

U.S. PATENT DOCUMENTS

2001/0045829 A1* 11/2001 Prammer et al. ............ 324/303
2002/0012053 A1* 1/2002 Yoshida ..................... 348/243
2006/0274173 A1 12/2006 Yoshida et al.

FOREIGN PATENT DOCUMENTS

WO 2006123828 A1 11/2006

* cited by examiner

*Primary Examiner*—Tuan Ho
(74) *Attorney, Agent, or Firm*—Zhigang Ma

(57) ABSTRACT

An image capturing device includes a capturing module, a numerical transform module, a brightness measuring module, and a processing module. The capturing module includes a lens unit and an image sensor. The lens unit forms an optical image onto the image sensor. The image sensor includes an effective pixel region and an optical black pixel region. The effective pixel region is configured for generating electrical image signals roughly corresponding to the optical image. The optical black pixel region is configured for generating dark currents corresponding to the electrical image signals. The numerical transform module is configured for transforming the dark currents into a first brightness value matrix. The brightness measuring module is configured for measuring a brightness component of the electrical image signals as a second brightness value matrix. The processing module is configured for subtracting the first brightness value matrix from the second brightness value matrix to obtain a corrected brightness component corresponding to the optical image.

9 Claims, 3 Drawing Sheets

IMAGE CAPTURING DEVICE AND BRIGHTNESS CORRECTING METHOD THEREOF

BACKGROUND

1. Technical Field

The present invention relates to image capturing devices and, particularly, to an image capturing device capable of correcting brightness of an image generated thereby and a brightness correcting method thereof.

2. Description of the Related Art

Electronic image sensors have been widely used in image capturing devices, such as digital cameras, mobile phones, and personal digital assistants. Such electronic image sensors are typically made from silicon via semiconductor manufacturing methods. As a result, these electronic image sensors have issues relating to dark currents due to thermal energy within the silicon lattice thereof. Specifically, electrons created over time that are independent of the light incident thereon are identified as image signals. Therefore, the image signal becomes distorted due to the untrue increase of the electrons therein.

What is needed, therefore, is an image capturing device and brightness correcting method that can overcome the above-described problem.

BRIEF DESCRIPTION OF THE DRAWINGS

Many aspects of the present image capturing device and brightness correcting method can be better understood with references to the accompanying drawings. The components in the drawings are not necessarily drawn to scale, the emphasis instead being placed upon clearly illustrating the principles of the present image capturing device and the brightness correcting method. Moreover, in the drawings, like reference numerals designate corresponding parts throughout the several views.

DETAILED DESCRIPTION

Embodiments of the present image capturing device and brightness correcting method will be now described in detail with references to the drawings. In the following embodiments, the image capturing device can be, but is not limited to, a digital still camera, a digital video camera, or any other electronic device equipped with a camera module.

Figure 1:
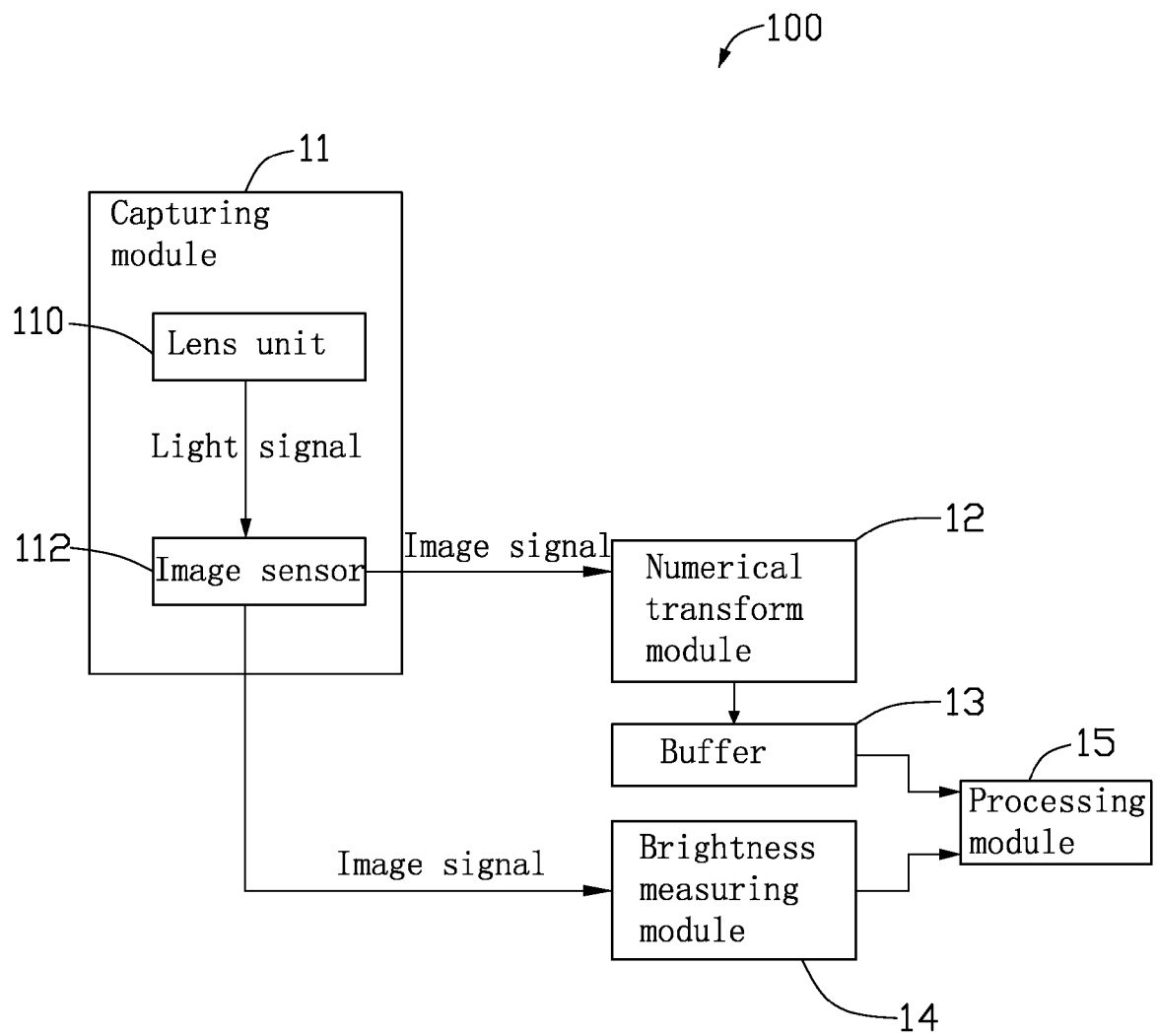
FIG. 1 is a functional block diagram of an image capturing device including an image sensor in accordance with an exemplary embodiment.
Figure 2:
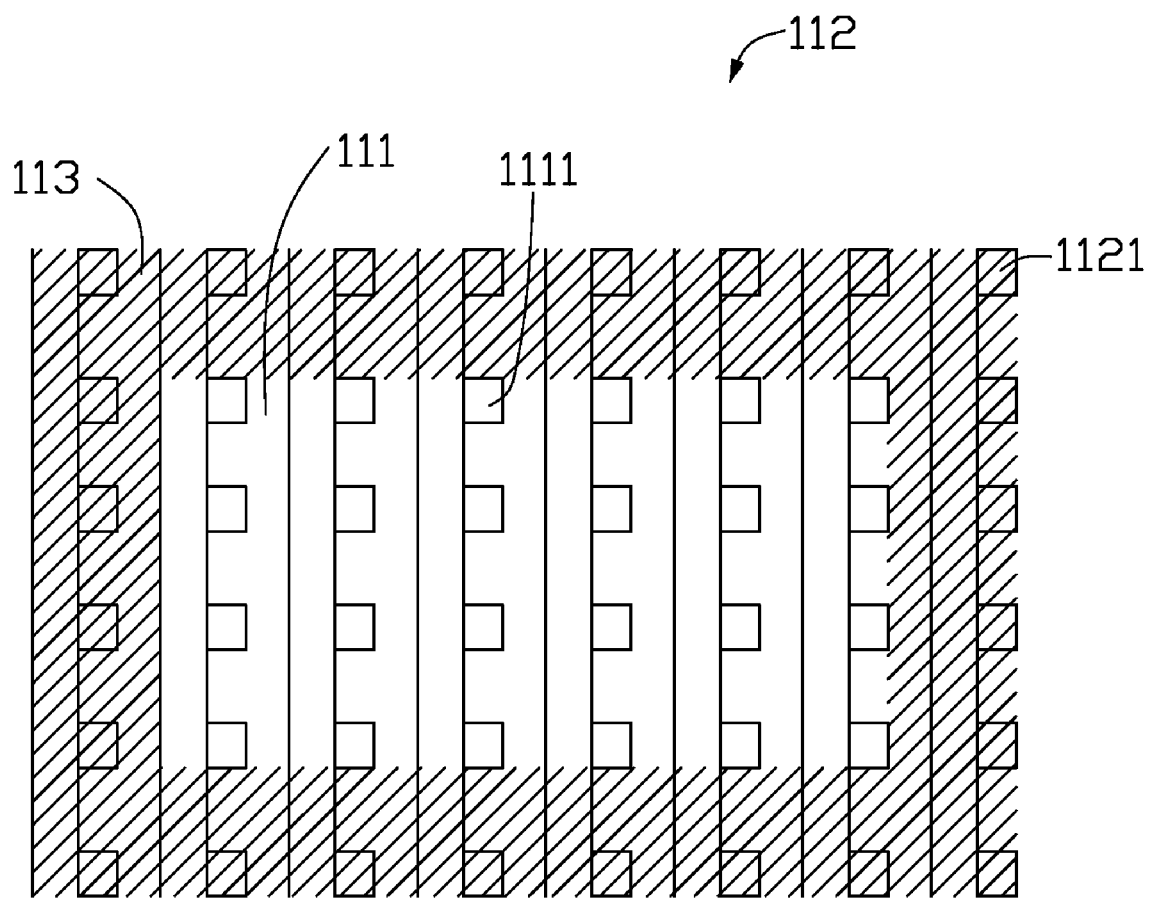
FIG. 2 is an enlarged, schematic view of the image sensor of FIG. 1.

Referring to FIGS. 1 and 2, an image capturing device 100, according to an exemplary embodiment, includes an capturing module 11, a numerical transform module 12, a buffer 13, a brightness measuring module 14, and a processing module 15. The image capturing module 11 includes a lens unit 110 and an image sensor 112. The lens unit 110 presents an optical image onto the image sensor 112. The image sensor 112 includes an effective pixel region 111 and an optical black region 113. The effective pixel region 111 is configured for generating an electrical image signal roughly corresponding to the optical image. The optical black region 113 is configured for generating dark currents corresponding to the electrical image signals. The numerical transform module 12 is configured for transforming the dark currents into a first brightness value matrix. The buffer 13 is configured for buffering the first brightness value matrix. The brightness measuring module 14 is configured for measuring a brightness component of the electrical image signal as a second brightness value matrix. The processing module 15 is configured for subtracting the first brightness value matrix from the second brightness value matrix to get a corrected brightness component corresponding to the optical image.

The lens unit 110 can be, for example, a zoom lens or a focus lens, and may include more than one lens. The image sensor 112 can be a charge coupled device (CCD) image sensor or a complementary metal oxide semiconductor (CMOS) image sensor. Ceramic leaded chip carrier (CLCC) package, a plastic leaded chip carrier (PLCC), or a chip scale package (CSP) may be used for packaging the image sensor 112.

The effective pixel region 111 comprises an array of effective pixels 1111, each of which is configured for photoelectric conversion. The optical black pixel region 113 comprises an array of optical black (OB) pixels 1121 that surround the effective pixels 1111. Each of the OB pixels 1121 corresponds to an effective pixel 1111 and has the same semiconductor structure as the corresponding effective pixels 1111 (this can be achieved by manufacturing the OB pixel 1121 and the corresponding effective pixel 1111 using same manufacturing parameters). As a result, each of the OB pixels 1121 can detect the dark current of the corresponding effective pixel 1111. In this embodiment, the current effective pixel region 111 has 760×1280 effective pixels 1111. The OB region 113 correspondingly has 760×1280 OB pixels 1121. The number of the effective pixels 1111 and OB pixels 1121, however, is not limited by this embodiment.

When capturing an image, the lens unit 110 presents an optical image onto the image sensor 112. The effective pixel region 111 of the image sensor 112 generates an electrical image signal roughly corresponding to the optical image. The optical black region 113 generates dark currents corresponding to the electrical image signals. The numerical transform module 12 is configured for receiving the dark currents from the OB pixels 1121, subsequently transforming the dark currents into a first brightness value matrix. The following table 1 shows an example of a first brightness value matrix.

TABLE 1

| Line | Row | | | | | | |
|---|---|---|---|---|---|---|---|
| | 1 | 2 | 3 | 4 | 5 | ... | 1280 |
| 1 | 2 | 3 | 3 | 4 | 6 | ... | 7 |
| 2 | 6 | 5 | 1 | 5 | 9 | ... | 0 |
| 3 | 0 | 2 | 3 | 1 | 5 | ... | 6 |
| 4 | 0 | 3 | 5 | 5 | 7 | ... | 5 |
| 5 | 1 | 2 | 4 | 9 | 0 | ... | 2 |
| ... | ... | ... | ... | ... | ... | ... | ... |
| 760 | 3 | 2 | 3 | 4 | 1 | 8 | 5 |

The brightness value is in a form of gray scale value and the first brightness value matrix is buffered in the buffer 13.

The brightness measuring module 14 is configured for extracting and measuring a brightness component of the electrical image signals. Specifically, the electrical image signals may include three components, such as Y, Cb and Cr, wherein Y, Cb and Cr represent a brightness component, blue-difference and red-difference chroma components, respectively. The following table 2 shows an example of a second brightness value matrix.

TABLE 2

| Row | Line | | | | | |
| --- | --- | --- | --- | --- | --- | --- |
|     | 1 | 2 | 3 | 4 | 5 | ... | 1280 |
| 1 | 11 | 23 | 33 | 14 | 16 | ... | 17 |
| 2 | 26 | 55 | 11 | 15 | 39 | ... | 10 |
| 3 | 10 | 12 | 30 | 31 | 25 | ... | 36 |
| 4 | 20 | 23 | 15 | 50 | 70 | ... | 35 |
| 5 | 21 | 23 | 54 | 79 | 80 | ... | 62 |
| ... | ... | ... | ... | ... | ... | ... | ... |
| 760 | 23 | 12 | 23 | 24 | 21 | 13 | 25 |

The processing module 15 receives the first brightness value matrix from the buffer 13 and the second brightness value matrix from the brightness measuring module 14, and then subtracting the first brightness value matrix from the second brightness value matrix to obtain a corrected brightness component corresponding to the optical image.

TABLE 3

| Row | Line | | | | | |
| --- | --- | --- | --- | --- | --- | --- |
|     | 1 | 2 | 3 | 4 | 5 | ... | 1280 |
| 1 | 9 | 20 | 30 | 10 | 10 | ... | 10 |
| 2 | 20 | 50 | 10 | 10 | 30 | ... | 10 |
| 3 | 10 | 10 | 27 | 30 | 20 | ... | 30 |
| 4 | 20 | 20 | 10 | 45 | 63 | ... | 30 |
| 5 | 20 | 21 | 50 | 70 | 80 | ... | 10 |
| ... | ... | ... | ... | ... | ... | ... | ... |
| 760 | 20 | 10 | 20 | 20 | 20 | 10 | 10 |

Figure 3:
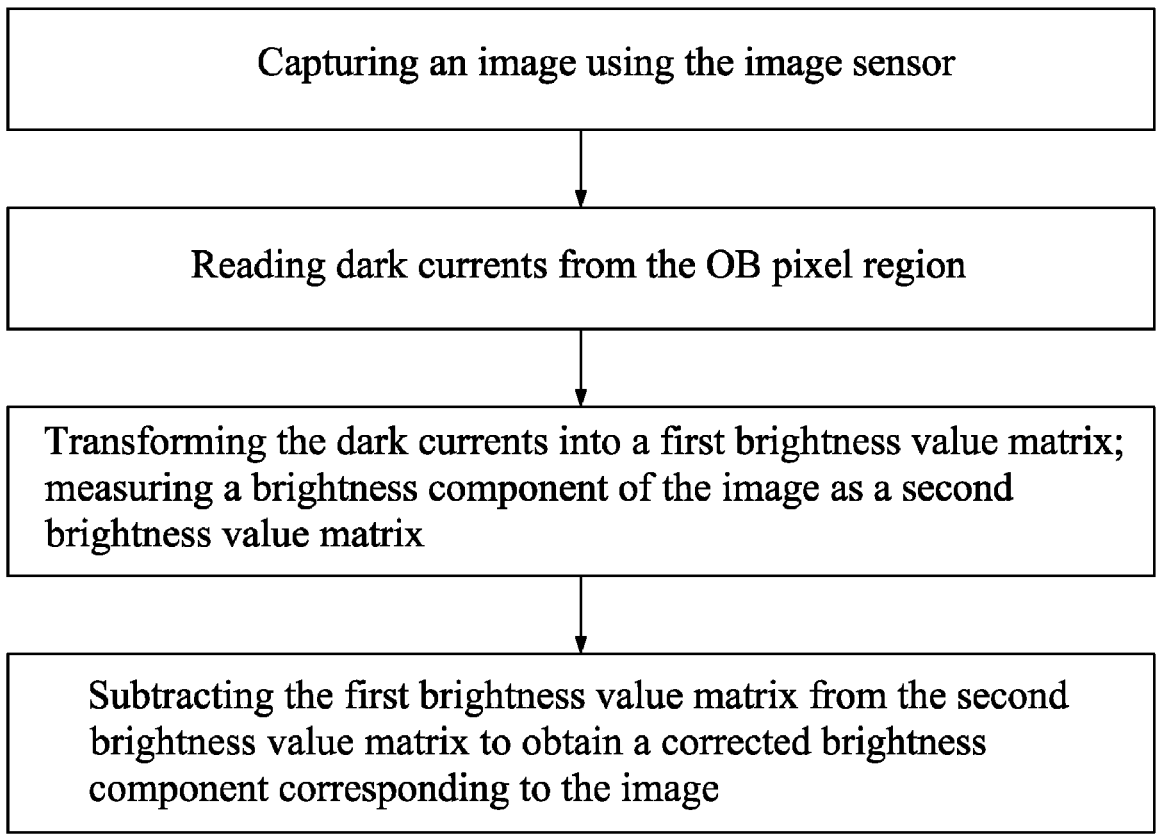
FIG. 3 is a flowchart of a brightness correcting method, according to another exemplary embodiment.

Referring to FIG. 3, a flowchart of a brightness correcting method for the image capturing device 100 is shown. The method includes the following steps: capturing an image using the image sensor; reading dark currents from the OB pixel region; transforming the dark currents into a first brightness value matrix; measuring a brightness component of the image as a second brightness value matrix; subtracting the first brightness value matrix from the second brightness value matrix to obtain a corrected brightness component corresponding to the image.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An image capturing device comprising:
    a capturing module including a lens unit and an image sensor, the lens unit being configured for forming optical images onto the image sensor, the image sensor including an effective pixel region and an optical black region, the effective pixel region being configured for generating electrical image signals corresponding to the optical image, the optical black region being configured for generating dark currents corresponding to the electrical image signals;
    a numerical transform module configured for transforming the dark currents into a first brightness value matrix;
    a brightness measuring module configured for measuring brightness component of the electrical image signals as a second brightness value matrix;
    a processing module configured for subtracting the first brightness value matrix from the second brightness value matrix to obtain a corrected brightness component corresponding to the optical image.

2. The image capturing device as claimed in claim 1, wherein the image capturing device is a device selected from the group consisting of a digital still camera, a digital video camera and any other electronic device equipped with a digital camera module.

3. The image capturing device as claimed in claim 1, wherein the image sensor is a charge-coupled device or a complementary metal oxide semiconductor device.

4. The image capturing device as claimed in claim 1, wherein the image sensor is one selected from the group consisting of a ceramic leaded chip carrier package type image sensor, a plastic leaded chip carrier package type image sensor and a chip scale package type image sensor.

5. An image capturing device comprising:
    a capturing module including a lens unit and an image sensor, the lens unit being configured for forming optical images onto the image sensor, the image sensor including an effective pixel region and an optical black region, the effective pixel region being configured for generating electrical image signals corresponding to the optical image, the optical black region being configured for generating dark currents corresponding to the electrical image signals;
    a numerical transform module configured for transforming the dark currents into a first brightness value matrix;
    a buffer configured for caching the first brightness value matrix;
    a brightness measuring module configured for measuring brightness component of the electrical image signals as a second brightness value matrix;
    a processing module configured for subtracting the first brightness value matrix buffered in the buffer from the second brightness value matrix to obtain a corrected brightness component corresponding to the optical image.

6. The image capturing device as claimed in claim 5, wherein the capturing device is a device selected from the group consisting of a digital still camera, a digital video camera and any other electronic device equipped with a digital camera module.

7. The image capturing device as claimed in claim 5, wherein the image sensor is a charge-coupled device or a complementary metal oxide semiconductor device.

8. The image capturing device as claimed in claim 1, wherein the image sensor is one selected from the group consisting of a ceramic leaded chip carrier package type image sensor, a plastic leaded chip carrier package type image sensor and a chip scale package type image sensor.

9. A brightness correcting method, comprising:
    exposing an image sensor, the image sensor comprising an effective pixel region and an optical black pixel region, the effective pixel region being configured for generating electrical image signals, the optical black pixel region being configured for generating dark currents corresponding to the electrical image signals;

receiving the dark currents;

transforming the dark currents into a first brightness value matrix;

extracting a brightness component of the electrical image signals as a second brightness value matrix; and subtracting the first brightness value matrix from the second brightness value matrix to obtain a corrected brightness component corresponding to the electrical image signals.

\* \* \* \* \*